United States Patent [19]

Heim et al.

[11] Patent Number: 5,465,185
[45] Date of Patent: Nov. 7, 1995

[54] MAGNETORESISTIVE SPIN VALVE SENSOR WITH IMPROVED PINNED FERROMAGNETIC LAYER AND MAGNETIC RECORDING SYSTEM USING THE SENSOR

[75] Inventors: David E. Heim, Redwood City; Stuart S. P. Parkin, San Jose, both of Calif.

[73] Assignee: International Business Machines Corporation, Armonk, N.Y.

[21] Appl. No.: 139,477

[22] Filed: Oct. 15, 1993

[51] Int. Cl.$^6$ ..................................................... G11B 5/39
[52] U.S. Cl. ...................... 360/113; 324/207.21; 324/252; 338/32 R
[58] Field of Search ........................ 360/113; 338/32 R, 338/32 H; 324/252, 207.21

[56] References Cited

U.S. PATENT DOCUMENTS

| | | | |
|---|---|---|---|
| 4,949,039 | 8/1990 | Grunberg | 324/252 |
| 5,134,533 | 7/1992 | Friedrich et al. | 360/113 |
| 5,159,513 | 10/1992 | Dieny et al. | 360/113 |
| 5,206,590 | 4/1993 | Dieny et al. | 324/252 |
| 5,287,238 | 2/1994 | Baumgart et al. | 360/113 |
| 5,301,079 | 4/1994 | Cain et al. | 360/113 |
| 5,304,975 | 4/1994 | Saito et al. | 338/32 R |
| 5,313,186 | 5/1994 | Schuhl et al. | 338/32 R |
| 5,315,468 | 5/1994 | Lin et al. | 360/113 |
| 5,341,261 | 8/1994 | Dieny et al. | 360/113 |

OTHER PUBLICATIONS

Binasch et al., "Enhanced Magnetoresistance in Layered Magnetic Structures with Antiferromagnetic Interlayer Exchange", Physical Review B, vol. 39, No. 7, Mar. 1, 1989, pp. 4828–4830.

Dieny et al., "Change in Conductance is the Fundamental Measure of Spin–Valve Magnetoresistance", Applied Phsyics Letters, vol. 61, No. 17, Oct. 26, 1992, pp. 2111–2113.

Dieny, "Quantitative Interpretation of Giant Magnetoresistance Properties of Permalloy–based Spin–Valve Structures", Europhysics Letters, vol. 17, No. 3, Jan. 14, 1992, pp. 261–267.

Dieny, "Classical Theory of Giant Magnetoresistance in Spin–Valve Multilayers: Influence of Thickness, Number of Periods, Bulk and Interfacial Spin–dependent Scattering", Journal of Physics: Condensed Matter, vol. 4, 1992, pp. 8009–8020.

Dieny et al., "Giant Magnetoresistance in Soft Ferromagnetic Multilayers", Physical Review B, vol. 43, No. 1, Jan. 1, 1991, pp. 1297–1300.

Levy, "Giant Magnetoresistance in Magnetic Layered and Granular Materials", Science, vol. 256, May 15, 1992, pp. 972–973.

Parkin et al., "Giant Magnetoresistance in Antiferromagnetic Co/Cu Multilayers", Applied Physics Letters, vol. 58, No. 23, Jun. 10, 1991, pp. 2710–2712.

(List continued on next page.)

Primary Examiner—Stuart S. Levy
Assistant Examiner—George J. Letscher
Attorney, Agent, or Firm—Thomas R. Berthold

[57] ABSTRACT

A spin valve magnetoresistive (MR) sensor uses a multifilm laminated pinned ferromagnetic layer in place of the conventional single-layer pinned layer. The laminated pinned layer has at least two ferromagnetic films separated by an antiferromagnetically coupling film. By appropriate selection of the thickness of the antiferromagnetically coupling film, depending on the material combination selected for the ferromagnetic and antiferromagnetically coupling films, the ferromagnetic films become antiferromagnetically coupled. In the preferred embodiment, the pinned layer is formed of two films of nickel-iron (Ni—Fe) separated by a ruthenium (Ru) film having a thickness less than approximately 10 Å. Since the pinned ferromagnetic films have their magnetic moments aligned antiparallel with one another, the two moments can be made to essentially cancel one another by making the two ferromagnetic films of substantially the same thickness. As a result, there is essentially no dipole field to adversely affect the free ferromagnetic layer, which improves the sensitivity of the sensor and allows higher recording density to be achieved in a magnetic recording data storage system.

46 Claims, 6 Drawing Sheets

OTHER PUBLICATIONS

Parkin et al., "Spin Engineering: Direct Determination of the Ruderman–Kittel–Kasuya–Yosida Far–field Range Function in Ruthenium", Physical Review B, vol. 44, No. 13, Oct. 1, 1991, pp. 7131–7134.

Parkin et al., "Oscillations in Exchange Coupling and Magnetoresistance in Metallic Superlattice Structures: Co/Ru, Co/Cr, and Fe/Cr", Physical Review Letters, vol. 64, No. 19, May 7, 1990, pp. 2304–2307.

Parkin et al., "Oscillatory Magnetic Exchange Coupling Through Thin Copper Layers", Physical Review Letters, vol. 66, No. 16, Apr. 22, 1991, pp. 2152–2155.

Parkin, "Systematic Variation of the Strength and Oscillation Period of Indirect Magnetic Exchange Coupling through the 3d, 4d, and 5d Transition Metals", Physical Review Letters, vol. 67, No. 25, Dec. 16, 1991, pp. 3598–3601.

Parkin, "Giant Magnetoresistance and Oscillatory Interlayer Exchange Coupling in Copper Based Multilayers", Materials Research Society Symposium Proceedings, vol. 231, 1992, pp. 211–216.

Pennisi, "Magnetic Advantage: Magnetic Fields Make New Thin Films Better Conductors", Science News, vol. 142, Aug. 29, 1992, pp. 140–142.

Si/Ta(70Å)/NiFe(70Å)/Cu(27Å)/NiFe(29Å)/MnFe(90Å)/Ru(25Å)

Si/Ta(70Å)/NiFe(70Å)/Cu(27Å)/NiFe(30Å)/Ru(5Å)/NiFe(30Å)/MnFe(90Å)/Ru(25Å)

MAGNETORESISTIVE SPIN VALVE SENSOR WITH IMPROVED PINNED FERROMAGNETIC LAYER AND MAGNETIC RECORDING SYSTEM USING THE SENSOR

TECHNICAL FIELD

This invention relates generally to a magnetoresistive (MR) sensor based on the spin valve effect for sensing magnetic fields, and more particularly to such a sensor having an improved pinned ferromagnetic layer, and to magnetic recording systems which incorporate such sensors.

BACKGROUND OF THE INVENTION

An MR sensor detects magnetic field signals through the resistance changes of a read element, fabricated of a magnetic material, as a function of the strength and direction of magnetic flux being sensed by the read element. The conventional MR sensor, such as that used in the IBM "Corsair" disk drive, operates on the basis of the anisotropic magnetoresistive (AMR) effect in which a component of the read element resistance varies as the square of the cosine of the angle between the magnetization in the read element and the direction of sense current flow through the read element. Recorded data can be read from a magnetic medium because the external magnetic field from the recorded magnetic medium (the signal field) causes a change in the direction of magnetization in the read element, which in turn causes a change in resistance in the read element and a corresponding change in the sensed current or voltage.

A different and more pronounced magnetoresistance, called giant magnetoresistance (GMR), has been observed in a variety of magnetic multilayered structures, the essential feature being at least two ferromagnetic metal layers separated by a nonferromagnetic metal layer. This GMR effect has been found in a variety of systems, such as Fe/Cr, Co/Cu, or Co/Ru multilayers exhibiting strong antiferromagnetic coupling of the ferromagnetic layers, as well as in essentially uncoupled layered structures in which the magnetization orientation in one of the two ferromagnetic layers is fixed or pinned. The physical origin is the same in all types of structures: the application of an external magnetic field causes a variation in the relative orientation of neighboring ferromagnetic layers. This in turn causes a change in the spin-dependent scattering of conduction electrons and thus the electrical resistance of the structure. The resistance of the structure thus changes as the relative alignment of the magnetizations of the ferromagnetic layers changes.

A particularly useful application of GMR is a sandwich structure comprising two uncoupled ferromagnetic layers separated by a nonmagnetic metallic layer in which the magnetization of one of the ferromagnetic layers is pinned. The pinning may be achieved by depositing the layer onto an iron-manganese (Fe—Mn) layer to exchange couple the two layers. This results in a spin valve magnetoresistive (SVMR) sensor in which only the unpinned or free ferromagnetic layer is free to rotate in the presence of an external magnetic field. U.S. Pat. No. 5,206,590, filed Dec. 11, 1990, and assigned to IBM, discloses a basic spin valve MR sensor. U.S. Pat. No. 5,159,513, filed Feb. 8, 1991, and also assigned to IBM, discloses a spin valve MR sensor in which at least one of the ferromagnetic layers is of cobalt or a cobalt alloy, and in which the magnetizations of the two ferromagnetic layers are maintained substantially perpendicular to each other at zero externally applied magnetic field by exchange coupling of the pinned ferromagnetic layer to an antiferromagnetic layer.

The spin valve MR sensor that has the most linear response and the widest dynamic range is one in which the magnetization of the pinned ferromagnetic layer is parallel to the signal field and the magnetization of the free ferromagnetic layer is perpendicular to the signal field. In the case where the spin valve MR sensor is to be used in a horizontal magnetic recording disk drive, this means that the plane of the sensor is perpendicular to the disk surface with the magnetization of the pinned layer oriented perpendicular to and the magnetization of the free layer oriented parallel to the disk surface. One difficulty in achieving this magnetization orientation is caused by the dipole field generated by the pinned layer. The pinned layer has a net magnetic moment and thus essentially acts as a macroscopic dipole magnet whose field acts on the free layer. In spin valve MR sensors, where the read element is relatively short, the result of this magnetostatic coupling is that the magnetization direction in the free layer is not uniform. This causes portions of the sensor to saturate prematurely in the presence of the signal field, which limits the sensor's dynamic range and thus the recording density and overall performance of the magnetic recording system.

What is needed is a spin valve MR sensor with an improved pinned ferromagnetic layer that has minimal magnetostatic coupling with the free ferromagnetic layer.

SUMMARY OF THE INVENTION

The invention is an improved spin valve MR sensor and magnetic recording system incorporating the sensor. The sensor uses a multifilm laminated pinned ferromagnetic layer in place of the conventional single-layer pinned layer. The laminated pinned layer has at least two ferromagnetic films antiferromagnetically coupled to one another across a thin antiferromagnetically (AF) coupling film. By appropriate selection of the thickness of the AF coupling film, depending on the material combination selected for the ferromagnetic and AF coupling films, the ferromagnetic films become antiferromagnetically coupled. In the preferred embodiment, the pinned layer is formed of two films of nickel-iron (Ni—Fe) separated by a ruthenium (Ru) film having a thickness in the range of approximately 3–6 Å. Since the pinned ferromagnetic films have their magnetic moments aligned antiparallel with one another, the two moments can be made to essentially cancel one another by making the two ferromagnetic films of substantially the same thickness. As a result, there is essentially no dipole field to adversely affect the free ferromagnetic layer, which improves the sensitivity of the sensor and allows higher recording density to be achieved in a magnetic recording system.

For a fuller understanding of the nature and advantages of the present invention, reference should be made to the following detailed description taken together with the accompanying figures.

DETAILED DESCRIPTION OF THE INVENTION

Prior Art

Figure 1:
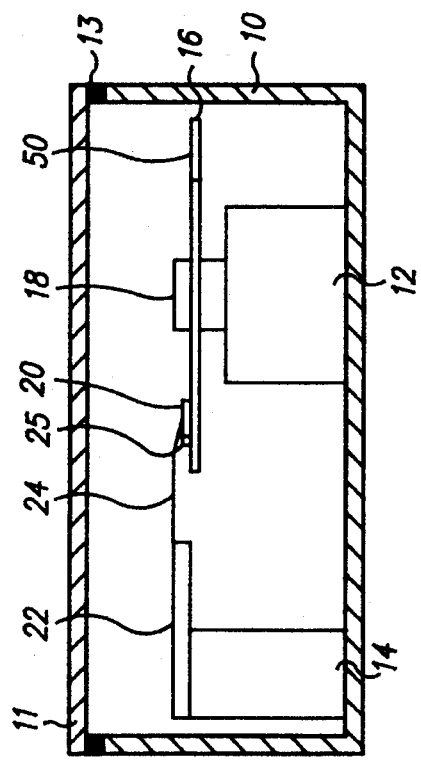
FIG. 1 is a simplified block diagram of a magnetic recording disk drive for use with the spin valve MR sensor according to the present invention.

Although the MR sensor of the present invention will be described as embodied in a magnetic disk storage system, as shown in FIG. 1, the invention is also applicable to other magnetic recording systems, such as a magnetic tape recording system, and to magnetic random access memory systems wherein a magnetoresistive element serves as a bit cell.

Referring to FIG. 1, there is illustrated in sectional view a schematic of a prior art disk drive of the type using an MR sensor. The disk drive comprises a base 10 to which are secured a disk drive motor 12 and an actuator 14, and a cover 11. The base 10 and cover 11 provide a substantially sealed housing for the disk drive. Typically, there is a gasket 13 located between base 10 and cover 11 and a small breather port (not shown) for equalizing pressure between the interior of the disk drive and the outside environment. A magnetic recording disk 16 is connected to drive motor 12 by means of hub 18 to which it is attached for rotation by the drive motor 12. A thin continuous lubricant film 50 is maintained on the surface of disk 16. A read/write head or transducer 25 is formed on the trailing end of a carrier, such as an air-bearing slider 20. Transducer 25 may be an inductive read and write transducer or an inductive write transducer with a magnetoresistive (MR) read transducer of the type to be described. The slider 20 is connected to the actuator 14 by means of a rigid arm 22 and a suspension 24. The suspension 24 provides a biasing force which urges the slider 20 onto the surface of the recording disk 16. During operation of the disk drive, the drive motor 12 rotates the disk 16 at a constant speed, and the actuator 14, which is typically a linear or rotary voice coil motor (VCM), moves the slider 20 generally radially across the surface of the disk 16 so that the read/write head may access different data tracks on disk 16.

Figure 2:
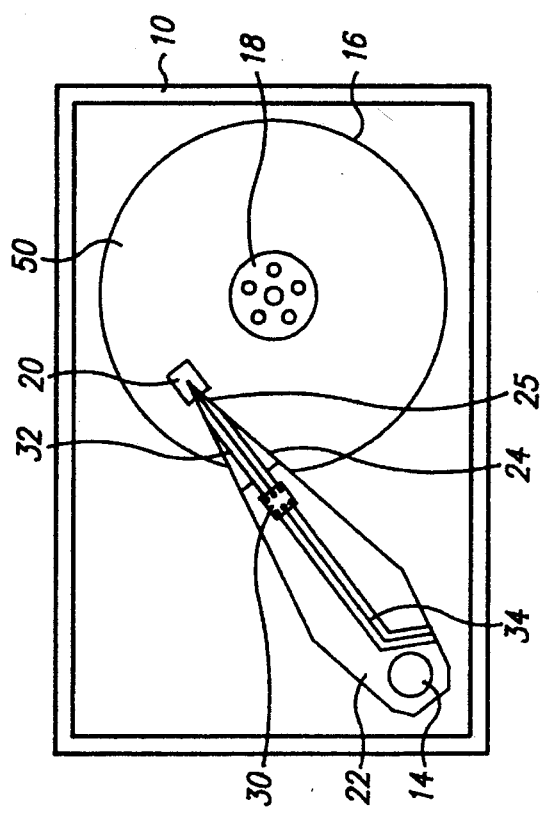
FIG. 2 is a top view of the disk drive of FIG. 1 with the cover removed.

FIG. 2 is a top view of the interior of the disk drive with the cover 11 removed, and illustrates in better detail the suspension 24 which provides a force to the slider 20 to urge it toward the disk 16. The suspension may be a conventional type of suspension such as the well-known Watrous suspension, as described in assignee's U.S. Pat. No. 4,167,765. This type of suspension also provides a gimbaled attachment of the slider which allows the slider to pitch and roll as it rides on the air bearing. The data detected from disk 16 by the transducer 25 is processed into a data readback signal by signal amplification and processing circuitry in the integrated circuit chip 15 located on arm 22. The signals from transducer 25 travel via flex cable 17 to chip 15, which sends its output signals via cable 19.

The above description of a typical magnetic disk storage system, and the accompanying FIGS. 1 and 2, are for representation purposes only. It should be apparent that disk storage systems may contain a large number of disks and actuators, and each actuator may support a number of sliders. In addition, instead of an air-bearing slider, the head carrier may be one which maintains the head in contact or near contact with the disk, such as in liquid bearing and other contact recording disk drives.

Figure 3:
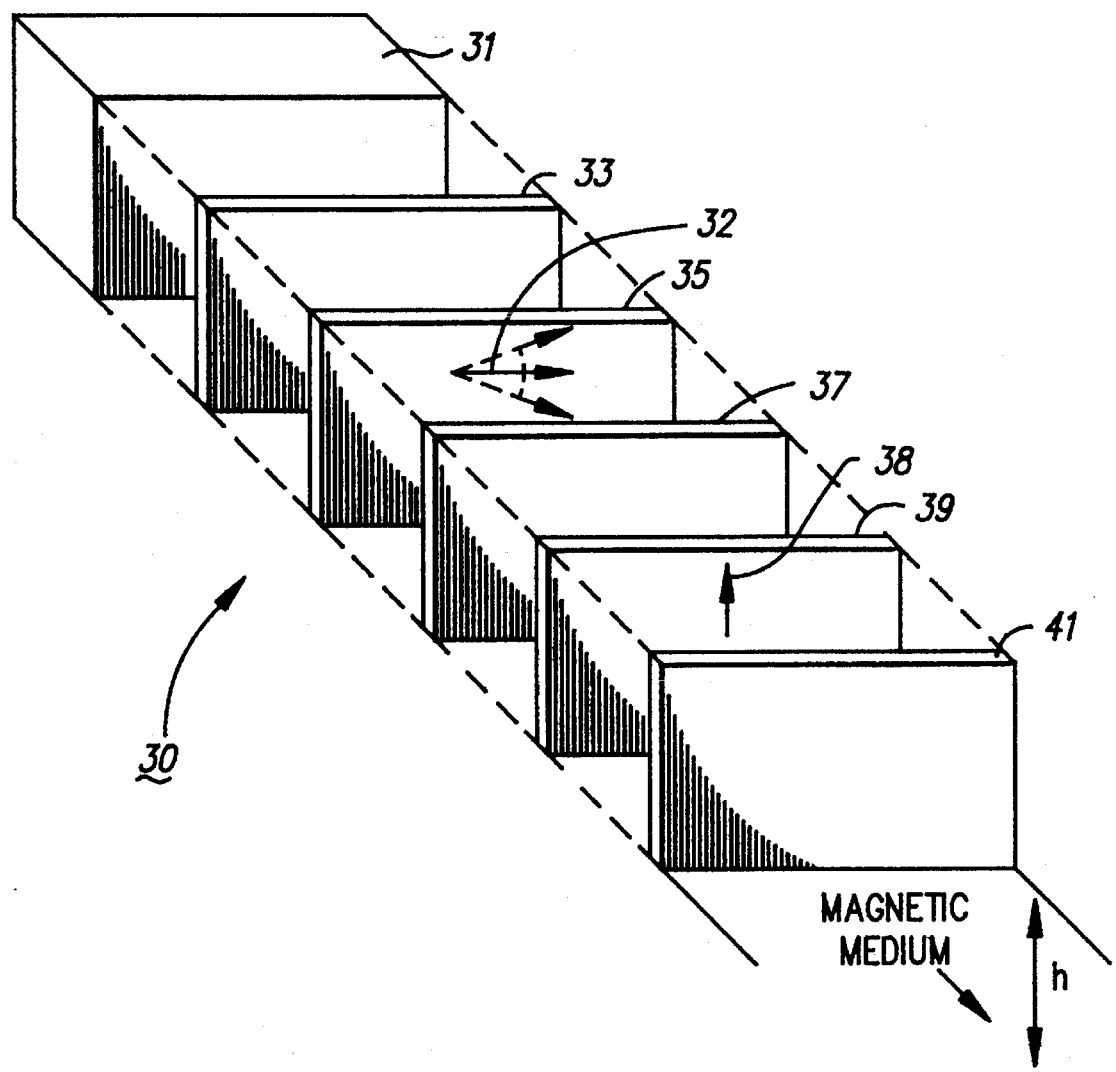
FIG. 3 is an exploded perspective view of a prior art spin valve MR sensor.

Referring now to FIG. 3, a prior art spin valve MR sensor 30 comprises a suitable substrate 31 such as glass, ceramic, or a semiconductor, for example, upon which is deposited a buffer layer 33, a first thin layer 35 of soft ferromagnetic material, a thin nonferromagnetic metallic spacer layer 37, and a second thin layer 39 of ferromagnetic material. The MR sensor 30 may form part of transducer 25 in the disk drive system of FIGS. 1 and 2 and the substrate 31 may be the trailing end of the head carrier or slider 20. In the absence of an externally applied magnetic field from the recorded magnetic medium, the magnetizations of the two layers 35, 39 of ferromagnetic material are oriented at an angle, preferably of about 90 degrees, with respect to each other, as indicated by arrows 32 and 38, respectively. The ferromagnetic layer 35 is called the "free" ferromagnetic layer in that its magnetization is free to rotate its direction in response to an externally applied magnetic field (such as magnetic field h as shown in FIG. 3), as shown by the dashed arrows on layer 35. The ferromagnetic layer 39 is called the "pinned" ferromagnetic layer because its magnetization direction is fixed or pinned in a preferred orientation, as shown by the arrow 38. A thin film layer 41 of an exchange biasing material having relatively high electrical resistance is deposited in direct contact with the ferromagnetic layer 39 to provide a biasing field by exchange coupling. Layer 41 thus pins the magnetization of the ferromagnetic layer in a preferred direction so that it cannot rotate its direction in the presence of an applied external magnetic field having a strength in the range of the signal field. The exchange bias layer 41 is typically a suitable antiferromagnetic material, such as iron-manganese (Fe—Mn) or nickel-manganese (Ni—Mn). Alternatively, the second ferromagnetic layer 39 can be pinned using a hard bias layer (not shown) or by other suitable methods as is known in the art.

Figure 4:
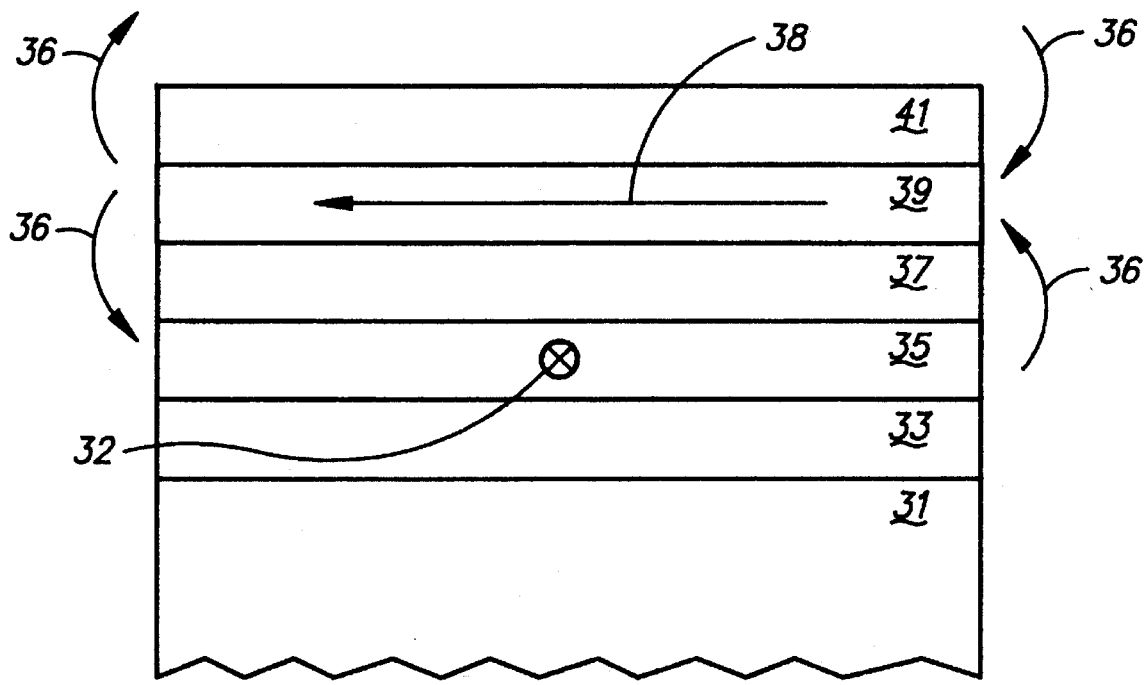
FIG. 4 is a sectional view of the spin valve MR sensor of FIG. 3, but rotated 90 degrees.

FIG. 4 is a sectional view of the structure of FIG. 3 but rotated 90 degrees so that the direction of magnetization of pinned layer 39 is in the plane of the paper, as shown by arrow 38. The pinned ferromagnetic layer 39 has a net macroscopic magnetic moment, represented by arrow 38, due to its preferred magnetization. The magnetic field (shown by flux lines 36) associated with this magnetic moment has an effect on the free ferromagnetic layer 35, which has its direction of magnetization (arrow 35 into the paper) formed at an angle of approximately 90 degrees to that of the pinned layer. This field from the pinned layer 39 causes the magnetization in the free layer 35 to be nonuniform. Because the free layer 35 is relatively short in the spin valve MR sensor, nonuniformity of the magnetization can cause portions of the sensor to saturate prematurely in the presence of an external applied signal field from the magnetic medium.

Preferred Embodiments

In the present invention, the single-layer pinned ferromagnetic layer is replaced by a laminated structure comprising at least two ferromagnetic films separated by a thin nonferromagnetic AF coupling film. The two ferromagnetic films are antiferromagnetically coupled to one another, by means of the appropriate type and thickness of AF coupling film, so that their pinned magnetizations are oriented antiparallel to one another.

Figure 5:
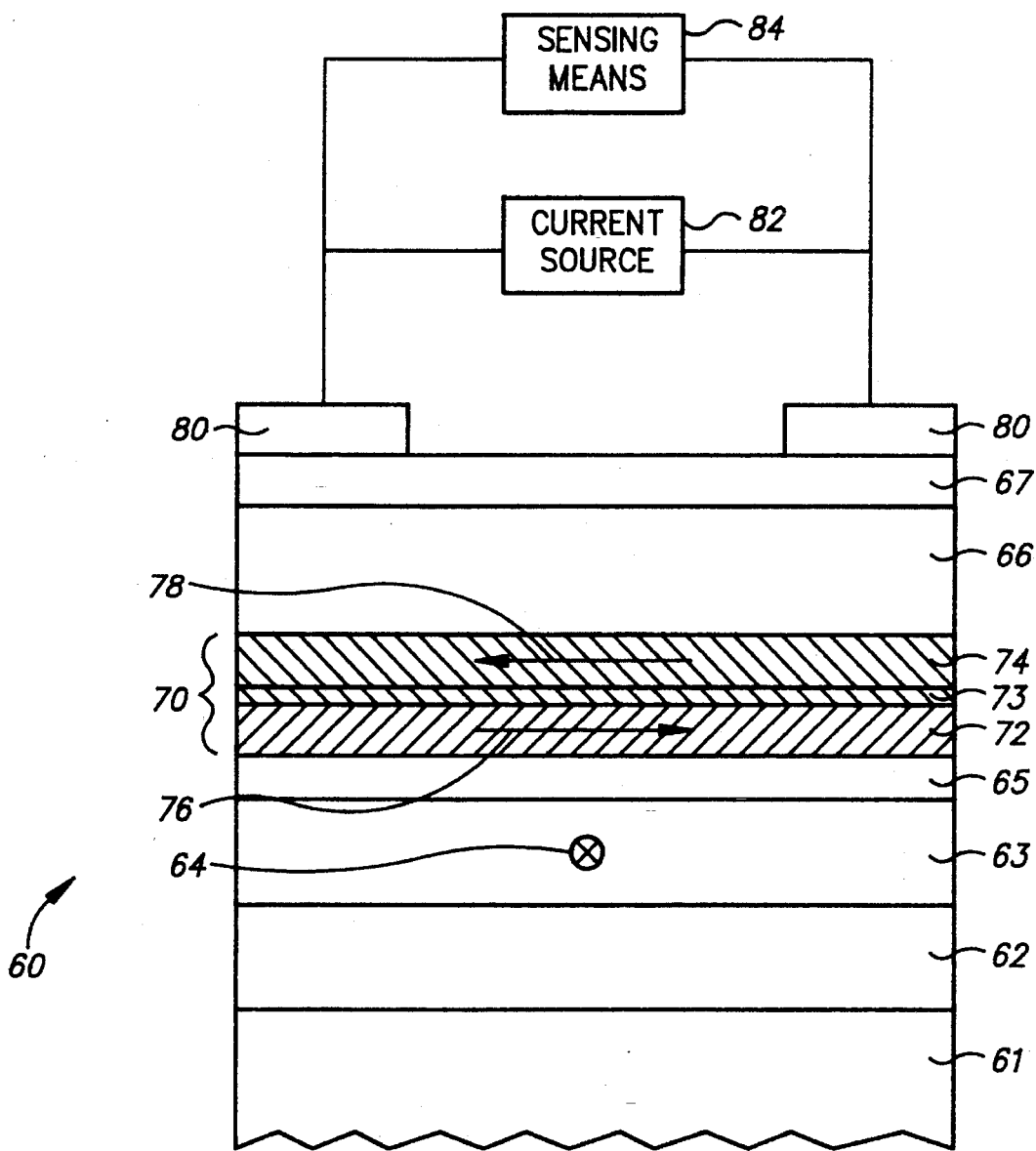
FIG. 5 is a sectional view of the spin valve MR sensor according to the present invention.

The preferred embodiment of the spin valve structure according to the present invention is shown schematically in FIG. 5. A spin film MR sensor 60 as shown in FIG. 5 was fabricated by DC magnetron sputter deposition by first depositing a 70 Å film of tantalum (Ta) as a buffer layer 62 onto a silicon (Si) substrate 61. Next, a 70 Å $Ni_{81}Fe_{19}$ free ferromagnetic layer 63 was deposited in the presence of an applied magnetic field so as to have its magnetization oriented in the direction of arrow 64 (into the paper in FIG. 5). A copper (Cu) layer 65 was then deposited onto the free Ni—Fe free layer 63 to a thickness of 27 Å to serve as the nonferromagnetic metallic spacer. While Cu was used as the spacer layer in this embodiment, other nonferromagnetic metallic materials with high electrical conductivity, such as silver (Ag), gold (Au), and their alloys, can be used. The pinned ferromagnetic layer 70, which replaces the single-layer pinned layer 39 in the prior art structure of FIG. 3, is a multifilm laminated structure that comprises a first $Ni_{81}Fe_{19}$ film 72 having a thickness of 30 Å formed directly on the copper spacer layer 65, a 5 Å ruthenium (Ru) film 73 deposited onto the first Ni—Fe film 72, and a second $Ni_{81}Fe_{19}$ film 74 of 30 Å thickness formed on the Ru film 73. The two pinned ferromagnetic films 72, 74 were deposited in the presence of an applied magnetic field rotated approximately 90 degrees from the field applied during the deposition of the free ferromagnetic Ni—Fe layer 63. An iron-manganese (Fe—Mn) film 66 of 90 Å thickness was then deposited on the second Ni—Fe film 74 to exchange couple with the second Ni—Fe film 74. Finally, a capping layer 67 of 25 Å of Ru was formed over the Fe—Mn film 66. Other suitable capping materials are high resistivity materials, such as tantalum (Ta), zirconium (Zr), or alloys of Cu and Au.

FIG. 5 also illustrates schematically the means for connecting the MR sensor to sensing circuitry in the magnetic recording system. Electrical leads 80 are provided to form a circuit path between the MR sensor and a current source 82 and a sensing means 84. As is well known in the art, additional sensor elements, such as transverse and longitudinal bias layers (not shown), may be required to provide an optimal MR sensor response circuit. In the preferred embodiment, a magnetic signal in the medium is sensed by the sensing means 84 detecting the change in resistance, deltaR, of the MR element as the magnetization of the free ferromagnetic layer 63 rotates in response to the applied magnetic signal from the recorded medium.

The two Ni—Fe films 72, 74 in the laminated pinned layer 70 have magnetization directions indicated by arrows 76, 78, respectively. The antiparallel alignment of the magnetizations of the two Ni—Fe films 72, 74 is due to an antiferromagnetic exchange coupling through Ru AF coupling film 73. Because of this antiferromagnetic coupling, and because the two Ni—Fe films 72, 74 have substantially the same thickness, the magnetic moments of each of the films cancel each other so that there is essentially no net magnetic moment in the pinned layer 70. Thus, there is essentially no magnetic dipole field generated by the pinned layer 70, and thus no magnetic field to affect the direction of magnetization 64 of the free ferromagnetic layer 63.

Figure 6A:
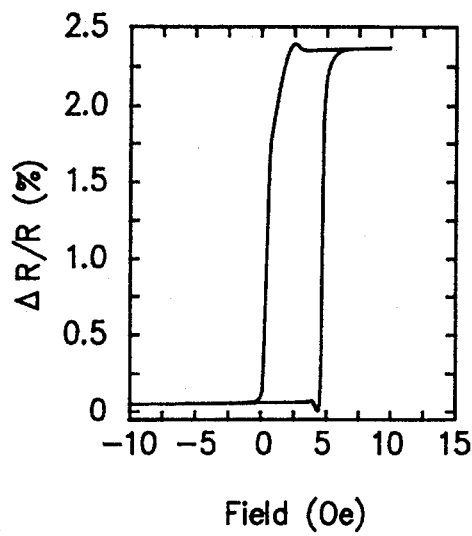
FIGS. 6A and 6B are graphs of saturation magnetoresistance versus signal field strength for a conventional spin valve MR sensor and a spin valve MR sensor according to the present invention.
Figure 6B:
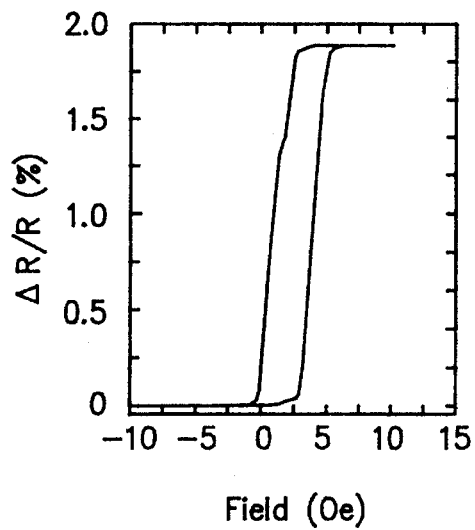

Referring now to FIGS. 6A and 6B, graphs of saturation magnetoresistance deltaR/R (the increase in resistance in low magnetic fields divided by the high magnetic field resistance) versus the signal field strength are shown. FIG. 6A is the graph for a Conventional spin valve MR sensor (of the type shown in FIG. 3) having a single-layer pinned layer, and FIG. 6B is the graph for the structure with the multifilm laminated pinned layer as described and shown in FIG. 5. FIG. 6B illustrates that the coercivity (the width of the hysteresis curve) of the structure with the laminated pinned layer is less than that for the conventional spin valve structure so that, with the present invention, smaller signal fields can be detected. In addition to the data of FIG. 6B, separate magnetization versus signal field curves demonstrated that the moment of the laminated pinned layer is reduced at low fields, which confirms that this laminated pinned layer is comprised of two films coupled antiferromagnetically.

While in the embodiment shown in FIG. 5, the pinned ferromagnetic layer 70 comprises two antiferromagnetically coupled films 72, 74 separated by a single AF coupling film 73. The pinned layer 70 can comprise a multiple number of ferromagnetic films separated by AF coupling films.

Figure 7:
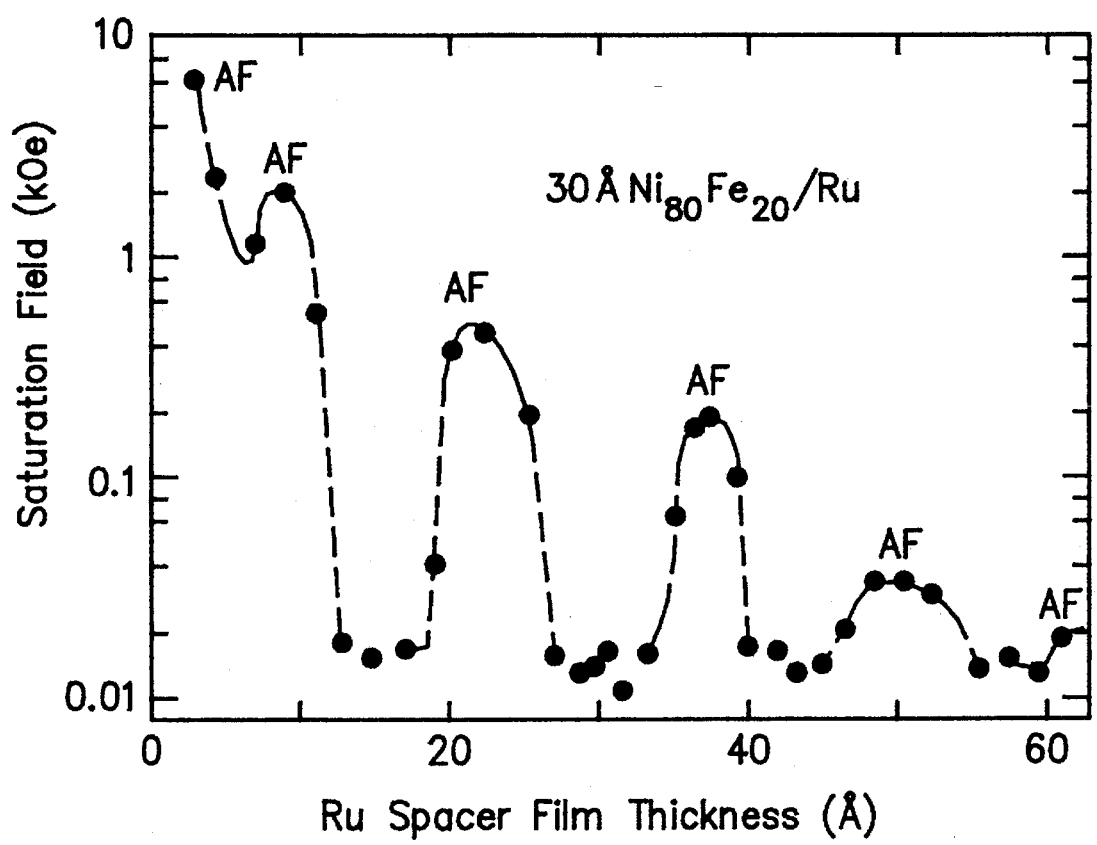
FIG. 7 is a graph of saturation magnetic field strength versus AF coupling film thickness for a laminated Ni—Fe/Ru/Ni—Fe structure.

Depending upon the materials selected for the ferromagnetic films 72, 74 and AF coupling film 73 in the laminated pinned layer 70, there is a preferred AF coupling film thickness at which the ferromagnetic films become strongly antiferromagnetically coupled. For the case of the preferred Ni—Fe/Ru combination, the thickness of the Ru AF coupling film can be selected with reference to FIG. 7. FIG. 7 is a graph of the saturation field as a function of Ru spacer layer thickness for a 30 Å $Ni_{80}Fe_{20}$/Ru combination. The peaks of this oscillatory relationship (designated AF in FIG. 7) are those thicknesses at which antiferromagnetic coupling of the two Ni—Fe films occurs, resulting in the desired antiparallel alignment of the magnetic moments in the two Ni—Fe films. As shown in FIG. 7, the greatest antiferromagnetic exchange coupling strength occurs at less than approximately 10 Å. The AF coupling film thickness must not be so thin, however, that a significant number of pin holes occur in the film, which would affect its antiferromagnetic coupling strength. Thus, in the case of Ru, the preferred thickness is in the range of approximately 3–6 Å. However, for this combination of materials, other Ru AF coupling film thicknesses, for example approximately 20 Å, may also be possible, although the strength of the coupling would be less than for the Ru thickness of less than 10 Å. The oscillatory coupling relationship for selected material combinations, of which FIG. 7 is typical, is described in detail by Parkin et al. in *Phys. Rev. Lett.*, Vol. 64, p. 2034 (1990).

If the thicknesses of the two ferromagnetic films 72, 74 forming the laminated pinned layer 70 are identical, then in theory the net moment of the pinned layer 70 would be zero because each of the magnetic moments would precisely cancel. Because it is not possible to precisely form each of the films to the exact same thickness, the net moment of the pinned layer 70 will likely be a small but nonzero value as a natural result of the normal deposition process. However, it may be desirable to deliberately deposit one of the pinned ferromagnetic films to a thickness slightly greater than that of the other film so that there would be a small nonzero net magnetic moment in the pinned layer. This would assure that the magnetization of the pinned layer 70 is stable in the presence of small magnetic fields so that the direction of its magnetization is predictable. Also, by controlling the thickness of each of the pinned ferromagnetic films 72, 74, it is possible to control the direction of the exchange bias field of the Fe—Mn layer 66, which may be desirable in certain MR structures. The net moment of the two films 72, 74 will be parallel to the moment of the thicker of the two films so that if film 74 is made to be the thicker film, then its direction of magnetization 78 will be parallel to the applied field during deposition. When the Fe—Mn is deposited, its direction of magnetization will be antiparallel to the applied field during deposition.

While the laminated pinned layer in the spin valve MR sensor has been shown with the preferred materials of Ni—Fe and Ru as the ferromagnetic and AF coupling film, respectively, other material combinations are possible, such as iron/chromium (Fe/Cr), and other ferromagnetic materials (such as Co, Fe, Ni, and their alloys, such as Ni—Fe, Ni—Co, and Fe—Co) with other AF coupling films (such as Ru, Cr, rhodium (Rh), iridium (Ir), and their alloys). However, for each such material combination, the oscillatory exchange coupling relationship, such as that shown in FIG. 7 for Ni—Fe/Ru, would have to be determined, if not already known, so that the thickness of the AF coupling film can be selected to assure antiferromagnetic coupling between the two ferromagnetic films. Also, while the pinned ferromagnetic film 72 adjacent Cu spacer layer 65 is a single Ni—Fe film, it is possible to form this pinned film as a two-film structure of a Ni—Fe film and a thin Co film adjacent the Cu spacer layer 65. Similarly, the free ferromagnetic layer 63 may also include a thin Co film adjacent the spacer layer 65. These Co films increase the magnetoresistance of the sensor but are maintained relatively thin, in the range of 2–20 Å, to minimize the effect of the relatively "hard" magnetic Co material on the permeability of the sensor.

While the present invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

What is claimed is:

1. A magnetoresistive sensor comprising:

a first layer and a second layer of ferromagnetic material separated by a spacer layer of nonmagnetic material, the magnetization direction of said first layer of ferromagnetic material being at an angle relative to the magnetization direction of said second layer of ferromagnetic material at zero applied magnetic field, the second layer of ferromagnetic material comprising first and second ferromagnetic films antiferromagnetically coupled to one another and an antiferromagnetically coupling film located between and in contact with the first and second ferromagnetic films for coupling the first and second ferromagnetic films together antiferromagnetically so that their magnetizations are aligned antiparallel with one another and remain antiparallel in the presence of an applied magnetic field; and means for maintaining the magnetization of one of the ferromagnetic films in the second ferromagnetic layer in a fixed direction in the presence of an applied magnetic field, whereby while the magnetization of the first layer is free to rotate in the presence of an applied magnetic field the magnetization directions of the first and second ferromagnetic films in the second layer remain fixed and antiparallel to one another.

2. A magnetoresistive sensor as in claim 1 wherein the antiferromagnetically coupling film in the second ferromagnetic layer consists essentially of Ru.

3. A magnetoresistive sensor as in claim 2 wherein the Ru film has a thickness in the range of approximately 3–6 Angstroms.

4. A magnetoresistive sensor as in claim 2 wherein the first and second ferromagnetic films in the second ferromagnetic layer consist essentially of Ni—Fe.

5. A magnetoresistive sensor as in claim 1 wherein the first and second ferromagnetic films in the second ferromagnetic layer consist essentially of Fe, and wherein the antiferromagnetically coupling film in the second ferromagnetic layer consists essentially of Cr.

6. A magnetoresistive sensor as in claim 1 wherein the first and second ferromagnetic films in the second ferromagnetic layer are made of a material selected from the group consisting of Co, Fe, Ni, and their alloys, and wherein the antiferromagnetically coupling film in the second ferromagnetic layer is made of a material selected from the group consisting of Ru, Cr, rhodium (Rh), iridium (Ir), and their alloys.

7. A magnetoresistive sensor as in claim 1 wherein the second ferromagnetic layer has essentially zero net magnetic moment.

8. A magnetoresistive sensor as in claim 1 wherein the first and second films in the second ferromagnetic layer have substantially the same thickness.

9. A magnetoresistive sensor as in claim 1 wherein the ferromagnetic film adjacent to the spacer layer is thinner than the other ferromagnetic film in the second ferromagnetic layer.

10. A magnetoresistive sensor as in claim 1 wherein the magnetization maintaining means comprises an exchange bias layer of antiferromagnetic material adjacent to and in contact with one of the ferromagnetic films in the second ferromagnetic layer.

11. A magnetoresistive sensor as in claim 10 wherein the antiferromagnetic layer comprises a material selected from the group consisting of iron-manganese and nickel-manganese.

12. A magnetoresistive sensor as in claim 1 wherein the nonmagnetic spacer layer comprises a material selected from the group consisting of silver, gold, copper, and alloys of silver, gold, and copper.

13. A spin valve magnetoresistive sensor comprising:

a substrate; and a layered structure formed on the substrate, the layered structure comprising:

a free ferromagnetic layer having a preferred axis of magnetization in the absence of an applied magnetic field;

a nonmagnetic spacer layer adjacent to the free ferromagnetic layer;

a first pinned ferromagnetic film adjacent to the spacer layer and having an axis of magnetization at an angle to the magnetization axis of the free ferromagnetic layer;

a second pinned ferromagnetic film having a direction of magnetization generally antiparallel to the magnetization direction of the first pinned ferromagnetic film;

an antiferromagnetically coupling film located between and in contact with the first and second pinned ferromagnetic films for coupling the first and second pinned ferromagnetic films together antiferromagnetically so that their magnetizations are aligned antiparallel with one another and remain antiparallel in the presence of an applied magnetic field; and an exchange bias layer of antiferromagnetic material adjacent to and in contact with the second pinned ferromagnetic film for pinning the magnetization of the second pinned ferromagnetic film in a fixed direction and thereby pinning the magnetization of the first pinned ferromagnetic film antiparallel to the magnetization of the second pinned ferromagnetic film to which it is antiferromagnetically coupled.

14. A spin valve magnetoresistive sensor as in claim 13 wherein the antiferromagnetically coupling film between the first and second pinned ferromagnetic films consists essentially of Ru.

15. A spin valve magnetoresistive sensor as in claim 14 wherein the Ru antiferromagnetically coupling film has a thickness in the range of approximately 3–6 Angstroms.

16. A spin valve magnetoresistive sensor as in claim 14 wherein the first and second pinned ferromagnetic films consist essentially of Ni—Fe.

17. A spin valve magnetoresistive sensor as in claim 13 wherein the first and second pinned ferromagnetic films consist essentially of Fe, and wherein the antiferromagnetically coupling film between the first and second pinned ferromagnetic films consists essentially of Cr.

18. A spin valve magnetoresistive sensor as in claim 13 wherein the first and second pinned ferromagnetic films are made of a material selected from the group consisting of Co, Fe, Ni, and their alloys, and wherein the antiferromagnetically coupling film is made of a material selected from the group consisting of Ru, Cr, rhodium (Rh), iridium (Ir), and their alloys.

19. A spin valve magnetoresistive sensor as in claim 13 wherein the first and second pinned ferromagnetic films have substantially the same thickness.

20. A spin valve magnetoresistive sensor as in claim 13 wherein the antiferromagnetically coupled first and second pinned ferromagnetic films have essentially zero net magnetic moment.

21. A spin valve magnetoresistive sensor as in claim 13 wherein the second pinned ferromagnetic film adjacent to the exchange bias layer is thicker than the first pinned ferromagnetic film.

22. A spin valve magnetoresistive sensor as in claim 13 wherein the exchange bias layer of antiferromagnetic material consists of a material selected from the group consisting of iron-manganese and nickel-manganese.

23. A spin valve magnetoresistive sensor as in claim 13 wherein the nonmagnetic spacer layer between the free ferromagnetic layer and the first pinned ferromagnetic film comprises a material selected from the group consisting of silver, gold, copper, and alloys of silver, gold, and copper.

24. A spin valve magnetoresistive sensor as in claim 13 wherein the first pinned ferromagnetic film includes a thin film of Co adjacent to the spacer layer.

25. A magnetic storage system comprising:

a magnetic storage medium having a plurality of tracks for the recording of data;

a magnetic transducer maintained close to the magnetic storage medium during relative motion between the magnetic transducer and the magnetic storage medium, the magnetic transducer including a magnetoresistive sensor comprising:
  a first layer and a second layer of ferromagnetic material separated by a spacer layer of nonmagnetic material, the magnetization direction of the first layer of ferromagnetic material being at an angle relative to the magnetization direction of the second layer of ferromagnetic material at zero applied magnetic field, the second layer of ferromagnetic material comprising first and second ferromagnetic films antiferromagnetically coupled to one another and an antiferromagnetically coupling film located between and in contact with the first and second ferromagnetic films for coupling the first and second ferromagnetic films together antiferromagnetically so that their magnetizations are aligned antiparallel with one another and remain antiparallel in the presence of an applied magnetic field; and means for maintaining the magnetization of one of the ferromagnetic films in the second ferromagnetic layer in a fixed direction in the presence of an applied magnetic field, whereby while the magnetization of the first layer is free to rotate in the presence of an applied magnetic field the magnetization directions of the first and second ferromagnetic films in the second layer remain fixed and antiparallel to one another; and means coupled to the magnetoresistive sensor for detecting resistance changes in the magnetoresistive sensor responsive to magnetic fields representative of data bits recorded in the magnetic storage medium intercepted by the magnetoresistive sensor.

26. A system as in claim 25 wherein the antiferromagnetically coupling film between the first and second ferromagnetic films in the second ferromagnetic layer consists essentially of Ru.

27. A system as in claim 26 wherein the Ru antiferromagnetically coupling film has a thickness in the range of approximately 3–6 Angstroms.

28. A system as in claim 25 wherein the first and second ferromagnetic films in the second ferromagnetic layer consist essentially of Ni—Fe.

29. A system as in claim 25 wherein the first and second ferromagnetic films in the second ferromagnetic layer consist essentially of Fe, and wherein the antiferromagnetically coupling film between the first and second ferromagnetic films consists essentially of Cr.

30. A system as in claim 25 wherein the first and second ferromagnetic films in the second ferromagnetic layer are made of a material selected from the group consisting of Co, Fe, Ni, and their alloys, and wherein the antiferromagnetically coupling film is made of a material selected from the group consisting of Ru, Cr, rhodium (Rh), iridium (Ir), and their alloys.

31. A system as in claim 25 wherein the first and second ferromagnetic films in the second ferromagnetic layer have substantially the same thickness.

32. A system as in claim 25 wherein the antiferromagnetically coupled first and second ferromagnetic films have essentially zero net magnetic moment.

33. A system as in claim 25 wherein the nonmagnetic spacer layer between the free ferromagnetic layer and the adjacent pinned ferromagnetic film comprises a material selected from the group consisting of silver, gold, copper, and alloys of silver, gold, and copper.

34. A system as in claim 25 wherein the means for maintaining the magnetization of one of the ferromagnetic films in the second ferromagnetic layer in a desired direction comprises an exchange bias layer of antiferromagnetic material adjacent to and in contact with the second ferromagnetic film, the antiferromagnetic layer providing a bias field in the second ferromagnetic film for maintaining the magnetization in the second ferromagnetic film and the antiferromagnetically coupled first ferromagnetic film in a desired direction.

35. A system as in claim 34 wherein the exchange bias layer of antiferromagnetic material consists of a material selected from the group consisting of iron-manganese and nickel-manganese.

36. A magnetic recording disk drive comprising:

a magnetic recording disk;

a motor connected to the disk for rotating the disk;

a spin valve magnetoresistive sensor for sensing magnetically recorded data on the disk, the sensor comprising:

a free ferromagnetic layer having a preferred axis of magnetization in the absence of an applied magnetic field;

a nonmagnetic spacer layer adjacent to the free ferromagnetic layer;

a first pinned ferromagnetic film adjacent to the spacer layer and having an axis of magnetization generally perpendicular to the magnetization axis of the free ferromagnetic layer;

a second pinned ferromagnetic film having a direction of magnetization generally antiparallel to the magnetization direction of the first pinned ferromagnetic film;

an antiferromagnetically coupling film located between and in contact with the first and second pinned ferromagnetic films for coupling the first and second pinned ferromagnetic films together antiferromagnetically so that their magnetizations are aligned antiparallel with one another and remain antiparallel in the presence of an applied magnetic field; and an exchange bias layer of antiferromagnetic material adjacent to and in contact with the second pinned ferromagnetic film for pinning the magnetization of the second pinned ferromagnetic film in a fixed direction and thereby pinning the magnetization of the first pinned ferromagnetic film antiparallel to the magnetization of the second pinned ferromagnetic film to which it is antiferromagnetically coupled;

a carrier supporting the spin valve magnetoresistive sensor, the carrier having a substrate onto which the sensor is attached;

an actuator for moving the carrier generally radially across the disk so the sensor may access different regions of magnetically recorded data on the disk;

means connecting the carrier to the actuator for maintaining the carrier near the disk;

means electrically coupled to the sensor for detecting changes in resistance of the sensor caused by rotation of the magnetization axis of the free ferromagnetic layer relative to the fixed, generally perpendicularly oriented magnetizations of the antiferromagnetically coupled first and second pinned ferromagnetic films in response to magnetic fields from the magnetically recorded disk; and means for supporting the motor and actuator.

37. A disk drive according to claim 36 wherein the antiferromagnetically coupling film between the first and second pinned ferromagnetic films in the spin valve magnetoresistive sensor consists essentially of Ru.

38. A disk drive according to claim 37 wherein the Ru antiferromagnetically coupling film has a thickness in the range of approximately 3–6 Angstroms.

39. A disk drive according to claim 36 wherein the first and second pinned ferromagnetic films in the spin valve magnetoresistive sensor consist essentially of Ni—Fe.

40. A disk drive as in claim 36 wherein the first and second pinned ferromagnetic films consist essentially of Fe, and wherein the antiferromagnetically coupling film between the first and second pinned ferromagnetic films consists essentially of Cr.

41. A disk drive as in claim 36 wherein the first and second pinned ferromagnetic films are made of a material selected from the group consisting of Co, Fe, Ni, and their alloys, and wherein the antiferromagnetically coupling film is made of a material selected from the group consisting of Ru, Cr, rhodium (Rh), iridium (Ir), and their alloys.

42. A disk drive as in claim 36 wherein the first and second pinned ferromagnetic films have substantially the same thickness.

43. A disk drive as in claim 36 wherein the antiferromagnetically coupled first and second ferromagnetic films have essentially zero net magnetic moment.

44. A disk drive as in claim 36 wherein the nonmagnetic spacer layer comprises a material selected from the group consisting of silver, gold, copper, and alloys of silver, gold, and copper.

45. A disk drive sensor as in claim 36 wherein the first pinned ferromagnetic film includes a thin film of Co adjacent to the spacer layer.

46. A disk drive as in claim 36 wherein the exchange bias layer of antiferromagnetic material consists of a material selected from the group consisting of iron-manganese and nickel-manganese.

\* \* \* \* \*